R. W. AVERITT.
COMBINED DIMMER AND ADJUSTER FOR HEADLIGHTS.
APPLICATION FILED APR. 4, 1917.
1,262,429.
Patented Apr. 9, 1918.
2 SHEETS—SHEET 2.
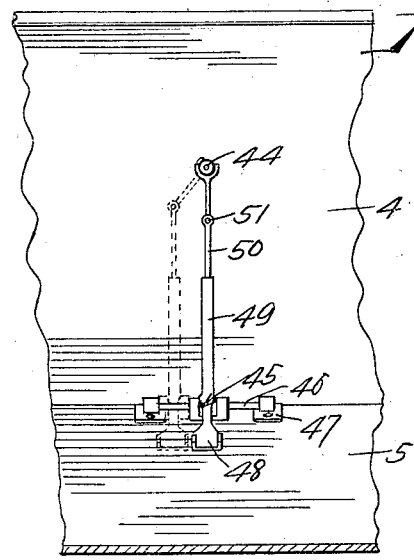
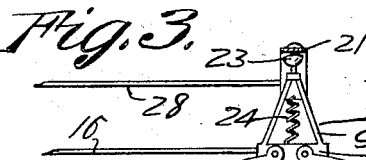
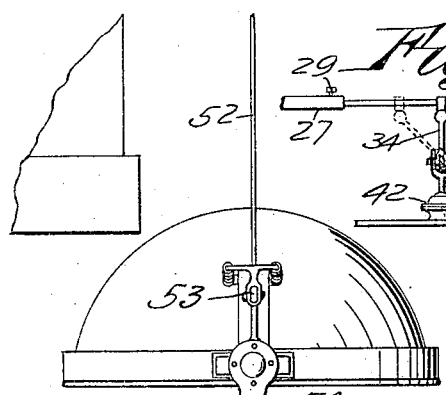
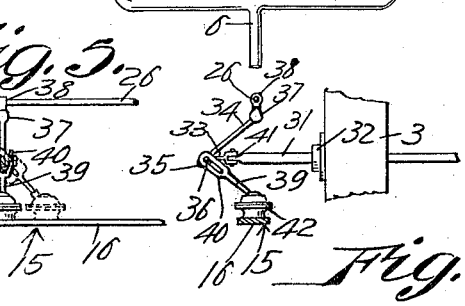
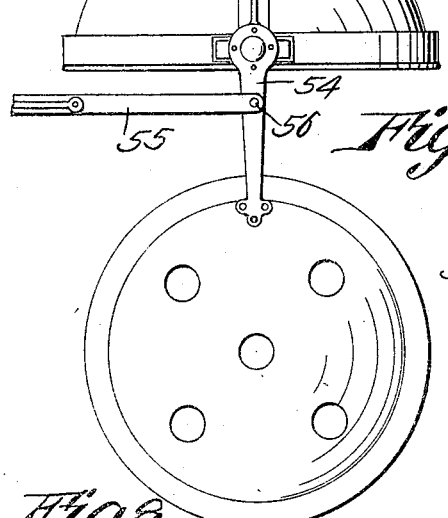
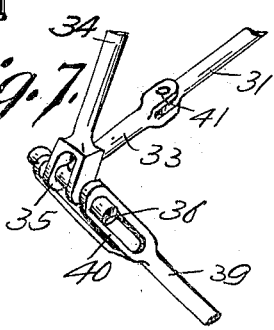
Inventor
R. W. Averitt,
By Talbert & Parker
Attorneys

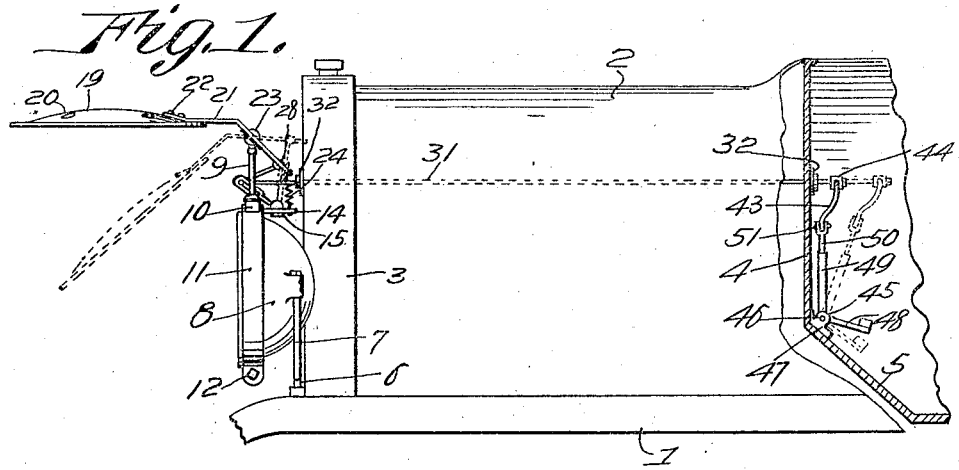
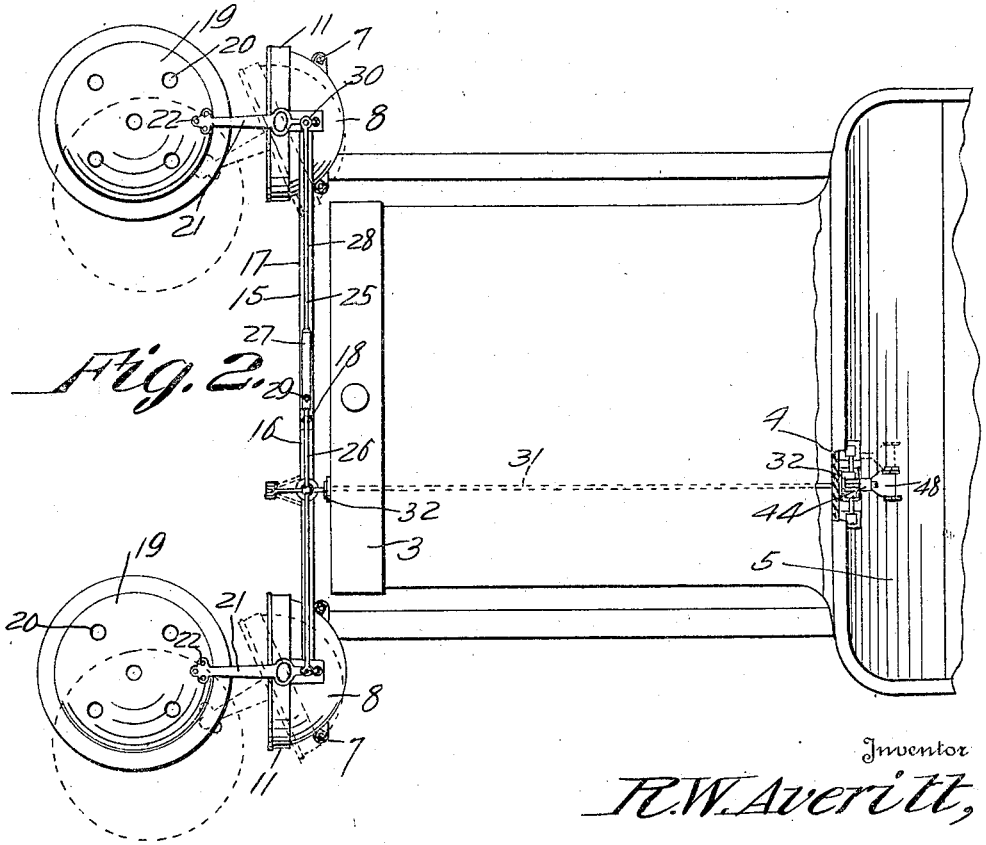

UNITED STATES PATENT OFFICE.

ROBERT W. AVERITT, OF FORT WORTH, TEXAS.

COMBINED DIMMER AND ADJUSTER FOR HEADLIGHTS.

1,262,429.  Specification of Letters Patent.  Patented Apr. 9, 1918.

Application filed April 4, 1917. Serial No. 159,738.

*To all whom it may concern:*

Be it known that I, ROBERT W. AVERITT, a citizen of the United States, residing at Fort Worth, in the county of Tarrant and State of Texas, have invented certain useful Improvements in Combined Dimmers and Adjusters for Headlights, of which the following is a specification, reference being had therein to the accompanying drawing.

The present invention has reference generally to improvements in that class of inventions known as illumination and more particularly relates to a combined dimmer and adjuster for headlights.

As the primary aim and object, the present invention contemplates the provision of novel means for mounting improved dimmers on the lamps of a motor vehicle or the like so that the dimmers may be adjusted together with respect to the lamps so as to assume various positions of vertical and horizontal adjustment and at times removably cover the lamps.

It is an additional and equally important object of the present invention to provide novel manually operable means for adjusting both the dimmers with respect to the lamps and for adjusting the lamps, the means being so constructed that the lamps and the dimmers may be adjusted simultaneously with each other or they may be adjusted independently.

More particularly, the present invention embraces the provision of the improved means operably arranged between the means for connecting the dimmers and the means for connecting the lamps so that the dimmer arms may be raised to consequently swing the dimmers to a closed position so that the lamps may be swung horizontally of the frame of the vehicle.

The invention as a further improvement consists in the provision of novel foot operable means for imparting either a rotary or sliding movement to the main operating rod.

More specific objects of the present invention reside in the provision of the means for attaching the dimmer supporting means to the lamps and also the improved resilient means for normally holding the dimmers in a raised position.

Among the other aims and objects of the present invention may be recited the provision of a device of the character mentioned with a view to compactness, and in which the number of parts are few, the construction simple, the cost of production low and the efficiency high.

Other improvements and novel details in the construction and arrangement of the various parts of the apparatus will be brought out more in detail in the description to follow, which for a clear understanding of the invention, should be considered in connection with the accompanying drawings forming a part hereof, and wherein is disclosed for the purpose of illustration convenient and satisfactory embodiments of the invention. It is to be noted in this connection that minor changes in the construction and arrangement of parts may be made without departing from the spirit of the invention or the principle of operation of the various parts.

The invention is clearly illustrated in the accompanying drawings, in which:—

Figure 1 is a side elevation, the dash of the vehicle being shown in section.

Fig. 2 is a top plan view of the same.

Fig. 3 is an enlarged fragmentary elevational detail of the foot operable means.

Fig. 4 is an enlarged front elevational detail of the dimmer supporting and attaching means.

Fig. 5 is an enlarged front elevational detail of the means for operably connecting the connecting means between the lamp and the dimmers.

Fig. 6 is a side elevation of Fig. 5.

Fig. 7 is a perspective detail of the means shown in Figs. 5 and 6, and

Fig. 8 is an enlarged fragmentary top plan of another form of the invention.

Similar characters of reference are employed in all of the above described views, to indicate corresponding parts.

Referring now, more particularly, to the accompanying drawings there is illustrated the front end of a motor vehicle such as an automobile embodying a frame above which is disposed a hood 2. A radiator 3 is at the front end of the hood and a dashboard 4 at the rear end thereof while a footboard 5 continues from the lower end of the dash. At the outset it will be understood that the particular form of these parts and in fact the particular form of vehicle form no essential part of this invention being merely illustrated in order that a comprehensive understanding of this invention may be obtained. Lamp supporting forks of any suitable design have their shanks 6 journaled upon opposite sides of the frame adjacent the front end. The arms 7 of the forks serve to support lamps 8 of a conventional design. Brackets 9 preferably of isosceles triangular shape have their bases 10 disposed above the lamps 8, while arcuate lamp clamping arms 11 are pivoted upon opposite ends of the bases. In removably holding the arms 11 on the lamps bolts 12 are extended through the outer angularly projecting terminals of the arms and are engaged by suitable adjusting devices such as winged nuts 13. Plates 14 extend rearwardly from the bases 10 while a sectional bar 15 is provided for connecting the plates so that the lamps may be consequently adjusted together. The bar consists of sections 16 and 17 the inner ends of which are adjustably connected to each other by means of a suitable fastening device 18 while their outer ends are pivoted by suitable fastening devices to the plates 14.

As intimated, improved means have been provided for dimming the headlamps 8 in the present instance consisting of circular dimmers 19 of a size capable of entirely closing the front faces of the headlights 8, the dimmers being provided with small openings 20 so that some of the light from the headlights may be projected therethrough. Angular arms 21 have their outer ends rigidly connected as at 22 to the dimmers and are each universally connected at a point between the inner end and the point of distortion to the top of the corresponding brackets 9 by means of a ball and socket joint 23. Suitable resilient means such as coil springs 24 the respective ends of which are connected to the inner ends of the arms 21 and to the plates 14 serve to normally hold the dimmers in a raised position.

For the purpose of connecting the dimmers so that they will be moved together a sectional rod indicated in its entirety by the numeral 25 is provided. The rod consists of a section 26 the inner end of which is telescoped within the tubular inner end 27 of the other section 28, the sections being held in various positions of adjustment by means of a set screw 29. The outer ends of the sections 26 and 28 are pivoted by suitable fastening devices 30 to the inner ends of the dimmer arms 21.

With a view toward providing novel means for operably connecting the dimmers and the headlights together and to the main operating means, a main actuating rod 31 is slidably and rotatably mounted in bearings 32 mounted respectively on the front face of the radiator and the outer face of the dash, the rod 31 extending beneath the hood and projecting beyond the radiator and the dash. A T-joint 33 has the inner end pivoted to the outer end of the rod 31 while a link 34 has one end forked as at 35 and pivoted about the outer ends 36 of the T-joint 33. The opposite end of the link is universally connected preferably by a ball and socket joint 37 to a sleeve 38 which is slidable on the section 26 of the rod 25. By this arrangement it will be appreciated that when the rod 31 is drawn inwardly the sectional rod 25 will be elevated to consequently swing the dimmers to a closed position against the tension of the springs 24. Another link 39 is now provided and has the outer end forked and the arms 40 of the fork being provided with slots 41 through the medium of which the arms 40 are slidably and pivotally arranged about the outer ends 36 of the T-joint 33 exteriorly of the arms of the fork 35. The opposite end of the link is universally connected preferably by a ball and socket joint 42 to the section 16 of the sectional bar 15. It will be apparent by this arrangement when the rod 31 is rotated in its bearings the sectional bar 15 will be moved horizontally and transversely with respect to the frame 1 to consequently arrange the lamps in various positions of horizontal adjustment.

In order to actuate the dimmers and the lamps either simultaneously with each other or independently with each other an arm 43 has one end rigidly connected as at 44 to the inner end of the rod 31. A substantially bell crank foot lever 45 is arranged for pivotal and sliding movement on the elongated pintle 46 carried by the brackets 47 in turn situated on top of the footboard 5. The lower end of the lever 45 serves as a foot engaging portion 48 while the upper end is constructed in the tubular form as indicated at 49 and slidably receives a rod 50, the outer end of which is bifurcated and pivoted as indicated by the numeral 51 to the outer end of the arm 43.

In Fig. 8 another form of the invention is disclosed. Instead of employing the slidably mounted rod 31 another rod 52 is adapted to be slidably mounted in the dash and pivotally connected to the upwardly projecting portion 53 formed on the inner end of the dimmer arm 54 which is mounted in a manner similar to that shown in the preferred form. The sectional rod 55 is mounted so that the outer ends of the outer sections are pivotally mounted as at 56 to points adjacent the pivot joints of the dimmer arms 54.

In operation, it will be appreciated that when the foot lever 45 is depressed the rod 31 will be drawn inwardly. Because of the fact that the link 34 is pivotally connected to the arms or outer ends 36 of the T-joint, the outer end of the link 34 will be drawn toward the radiator and because of the connection with the sectional rod 25 the latter will be elevated to consequently swing the dimmers about their pivots to a closed position. In adjusting the lamps the foot lever is slid to either side so as to partially rotate the rod 31 whereupon owing to the connection of the link 39 with the outer ends or arms 36 of the T-joint 33 the said link 39 will be swung to either side in a corresponding direction in which the foot lever is moved so as to consequently move the sectional bar 15 and also shift the lamps. It is to be appreciated that the parts may be actuated simultaneously by shifting and depressing the foot lever by one movement. Upon release of the foot lever 45 the retractile coil springs 24 will draw the inner ends of the dimmer arms 21 downwardly to consequently automatically return the dimmers to a raised position.

It is thought in view of the foregoing description that a further detailed description of the operation of the invention is entirely unnecessary. Likewise it is believed that the advantages of the invention will be readily apparent.

As many changes could be made in the above construction and many apparently widely different embodiments of this invention could be made without departing from the scope thereof, and it is intended that all matter contained in the above description or shown in the accompanying drawings shall be interpreted as illustrative and not in a limited sense. It is also to be understood that the language used in the following claims is intended to cover all the generic and specific features of the invention herein described and all statements of the scope of the invention, which, as a matter of language might be said to fall therebetween.

Having thus fully described this invention, what is claimed as new and desired to be secured by Letters-Patent is:—

1. The combination with a headlight of a bracket, headlight clamping arms pivoted to the bracket, means for removably holding the arms in engagement with the headlight to consequently position the bracket at the top of the headlight, a dimmer having openings therein, an arm extending from the dimmer and pivotally connected to the bracket, a plate projecting from the bracket, resilient means interposed between the plate and the inner end of the arm for normally holding the dimmer in a raised position, and means operably connected with the dimmer for moving the dimmer into a closed position.

2. The combination with a pair of spaced rotatable headlamps, means for connecting the lamps so that they will move together, of dimmers universally mounted above the headlamps, means for connecting the dimmers so that they will move together, means for normally holding the dimmers in an open position, a slidably and rotatably mounted actuating rod, means for operably connecting the rod with the means for connecting the lamps whereby to shift the lamps when the rod is partially rotated, means for operably connecting the rod with the means for connecting the dimmers whereby to move the dimmers to a closed position, and means for actuating the rod to consequently actuate the dimmers and the lamps either independently of or simultaneously with each other.

3. The combination with a pair of spaced rotatable headlamps, means for connecting the lamps so that they will move together, of dimmers universally mounted above the headlamps, means for connecting the dimmers so that they will move together, means for normally holding the dimmers in an open position, a slidably and rotatably mounted actuating rod, means for operably connecting the rod with the means for connecting the lamps whereby to shift the lamps when the rod is partially rotated, means for operably connecting the rod with the means for connecting the dimmers whereby to move the dimmers to a closed position, an arm carried by the inner end of the actuating rod, and a slidably and pivotally mounted footlever operably connected to the arm for actuating the dimmers or the lamps either independently of or simultaneously with each other.

4. The combination with a pair of spaced rotatable headlamps, of dimmers universally mounted above the headlamps, means for connecting the dimmers so that they will be moved together, means for normally holding the dimmers in an open position, a slidably and rotatably mounted actuating rod, means for operably connecting the rod with the means for connecting the dimmers whereby to move the dimmers to a closed position, and operating means connected to the rod for actuating the dimmers or the lamps either independently of or simultaneously with each other.

5. The combination with a pair of spaced headlamps, of dimmers mounted for swinging movement above the headlamps, means for connecting the dimmers so that they will be moved together, resilient means for normally holding the dimmers in an open position, a slidably mounted actuating rod, a T-joint having the inner end pivoted to the outer end of the actuating rod, a link pivotally connected to the outer ends of the T-joint and operably connected to the means for connecting the dimmers whereby when the rod is slid inwardly the dimmers will be swung to a closed position, and means for actuating the rod.

6. The combination with a pair of spaced rotatable headlamps and a sectional bar for connecting the lamps so that they will be moved together, of dimmers universally mounted above the headlamps, a sectional rod for connecting the dimmers so that they will be moved together, resilient means for normally holding the dimmers in an open position, a slidably and rotatably mounted actuating rod, a T-joint pivotally connected to the outer end of the actuating rod, a link having one end pivotally connected about the outer ends of the T-joint, a sleeve slidably mounted on the sectional rod and universally connected to the opposite end of the link whereby when the rod is moved inwardly the dimmers will be moved to a closed position, another link having one end slidably and pivotally arranged about the outer ends of the T-joint and the opposite end universally connected to the sectional bar whereby when the rod is partially rotated the lamps will be shifted, and means for actuating the rod.

In testimony whereof I affix my signature.

ROBERT W. AVERITT.